United States Patent [19]

Colanzi et al.

[11] Patent Number: 4,792,242
[45] Date of Patent: Dec. 20, 1988

[54] TIGHT BEARING SUITABLE FOR EXCEPTIONALLY HEAVY DUTY CONDITIONS

[75] Inventors: Franco Colanzi; Angelo Vignotto, both of Turin, Italy

[73] Assignee: RIV-SKF Officine di Villar Perosa S.p.A., Turin, Italy

[21] Appl. No.: 148,079

[22] Filed: Jan. 25, 1988

[30] Foreign Application Priority Data

Jan. 28, 1987 [IT]  Italy ................................. 67047 A/87

[51] Int. Cl.$^4$ ..................... F16C 33/72; F16C 33/76; F16C 33/80
[52] U.S. Cl. .................................... 384/482; 384/478; 384/480; 384/486
[58] Field of Search ................. 384/477, 480, 481–486

[56] References Cited

U.S. PATENT DOCUMENTS

| 3,639,016 | 2/1972 | Bourgeois | 384/482 |
| 3,994,545 | 11/1976 | Van Dorn | 384/485 X |
| 4,516,783 | 5/1985 | Mitsue et al. | 384/486 X |
| 4,555,188 | 11/1985 | Neal | 384/482 |
| 4,669,895 | 6/1987 | Colanzi et al. | 384/486 X |

FOREIGN PATENT DOCUMENTS 6921  1/1981  Japan ................................. 384/484

*Primary Examiner*—Stuart S. Levy
*Assistant Examiner*—Thomas R. Hannon
*Attorney, Agent, or Firm*—Bachman & LaPointe

[57] ABSTRACT

A tight bearing suitable for exceptionally heavy duty conditions is supplied with side screens (14) made of a plate composition (16) which is restrained to the external ring (10) of the bearing and forms a labyrinth seal against the internal ring (11), and of plastic and elastomer materials (15) supplied with a lip (17) which creates friction on the internal ring (11); other plates (18) are assembled externally with respect to the screens (14) and are integral on the internal ring (11) and form a labyrinth seal (23) with the external ring (10) of the bearing; the internal face of the external plates (28) is lined with a layer of plastic and elastomer material (19) from which at least one lip (20) extends and forms an essentially axial seal against the external face of the plate (16) of the internal adjacent screen (14); the lip (20) of the layer (19) which lines the internal face of the external plates (18) slips and seals along a certain length (21) of bent conical converging internal plate (16) towards the internal ring (11) and towards the external part of the bearing.

5 Claims, 1 Drawing Sheet

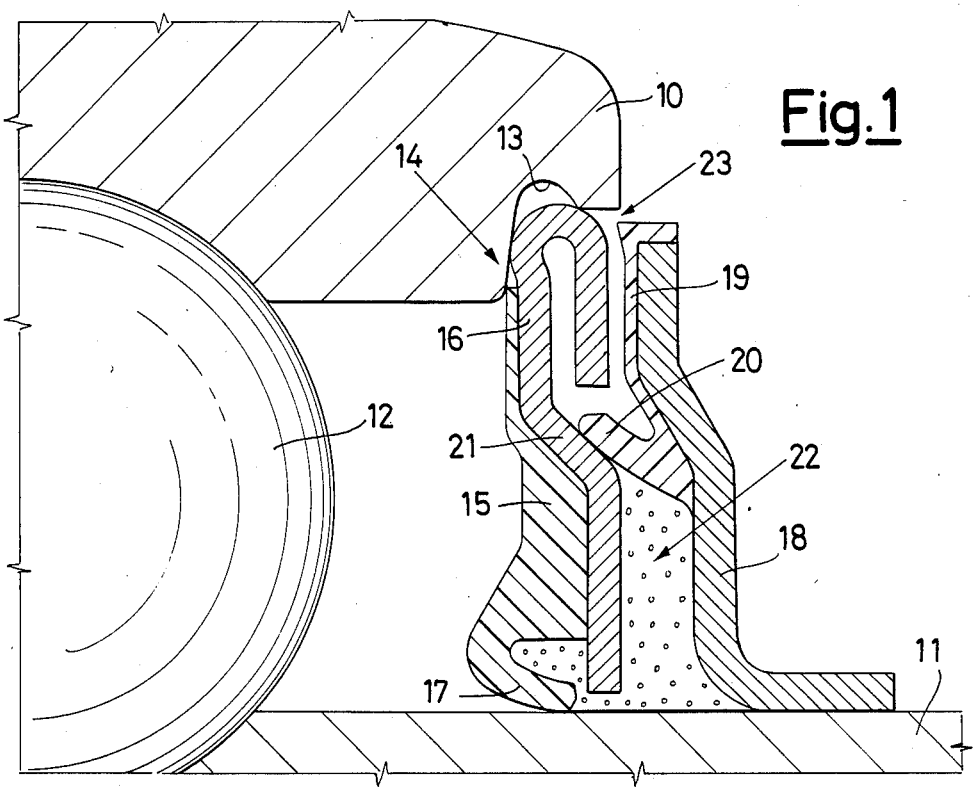
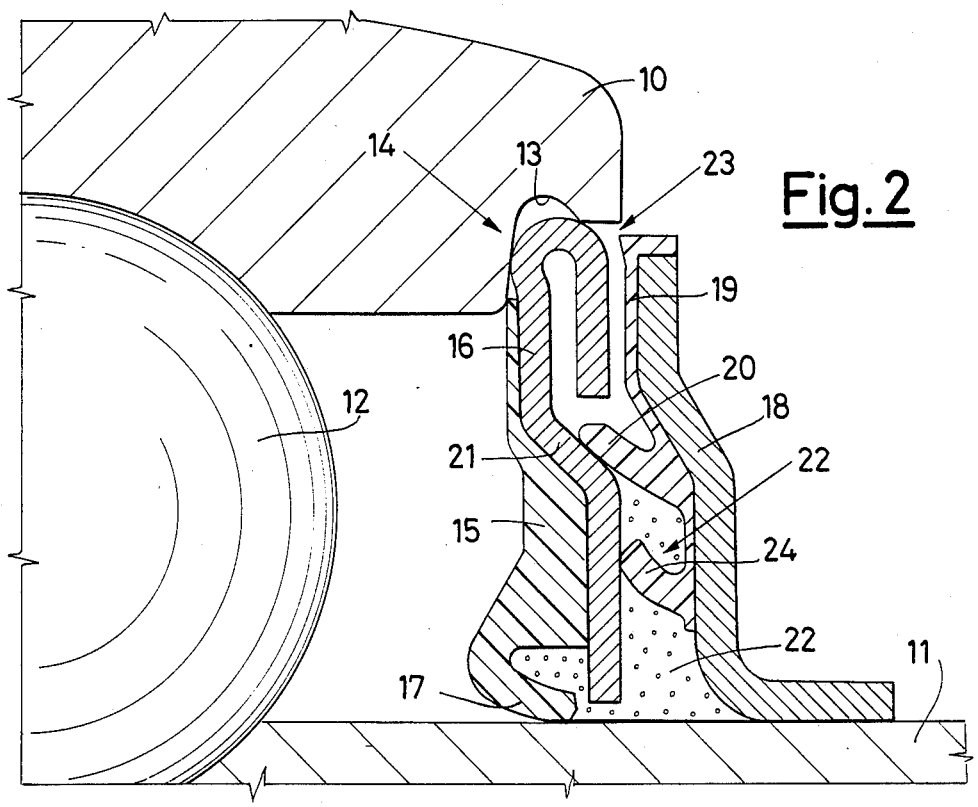

TIGHT BEARING SUITABLE FOR EXCEPTIONALLY HEAVY DUTY CONDITIONS

BACKGROUND OF THE INVENTION

The invention refers to a tight bearing suitable for particularly heavy duty conditions.

The bearings appointed to heavy duty operations are those as an example, assembled on the rotating parts of earthworks machines.

In these applications some elements like sand, stones, pebble gravel, mud, vegetable fibers, are very hard on the resistance and tightness of the bearing during all its operating life. At present, the bearings appointed to particularly heavy duty conditions are generally of the type having a multi-contact rubber seal, that is consisting of a central body restrained to the plate that acts as a screen, from which several abreast lips extend and form a seal on the rotating element. Alternatively, several abreast rubber rings are assembled in the respective housings of the screen-plate instead of a central rubber body.

These devices having several sealing lips have the purpose of creating barriers to stop the entrance of external agents into the body of the bearing.

Obviously, the more are the contact surfaces (lips) on the rotating part, the higher is the friction produced by the bearing: consequently, a reduction of the rotation speed takes places and/or a shorter life of the bearing.

Furthermore, the above solutions require a high precision of the parts assembly, and this may be difficult to realize; a violent crash of the element on which the bearing is assembled or a strong hit against a stone is sufficient to cancel the optimum assembly conditions and consequently a quick wear of the bearing takes place.

In order to remove the above mentioned troubles, the present invention proposes to provide a bearing supplied with an axial rubber lip applied on a protection plate assembled on the rotating part and sliding on a conical surface of the plate of the immovable part of the bearing.

This solution allows a sensible reduction of the friction as it is less responsive to axial variations both during assembly and if crashes occur. The possibility to operate at higher speed and lower operative temperature derives from the above statement and the result is a longer operating life of the bearing.

SUMMARY OF THE INVENTION

For these purposes and for further ones that will be understood better as the description follows, the invention proposes to provide a tight bearing suitable for exceptionally heavy duty conditions of the type supplied with side screens made of a plate composition which is restrained to the external ring of the bearing and forms a labyrinth seal against the internal ring, and of plastic and elastomer materials supplied with a lip which creates friction on the internal ring; other plates are assembled externally with respect to the screens and are integral on the internal ring and form a labyrinth seal with the external ring of the bearing characterized in that the internal face of the external plates is lined with a layer of plastic or elastomer materials from which at least one lip extends and forms an essentially axial seal against the external face of the plate of the internal adjacent screen.

BRIEF DESCRIPTION OF THE DRAWINGS

A description of two types of the bearing follows and reference must be made to the enclosed drawings: The two types are meant to be examples of, but not limiting to the present invention.

FIG. 1 is the part section view of the bearing according to the first embodiment of the invention.

FIG. 2 represents the view as in FIG. 1 of the bearing according to the second embodiment of the invention.

DETAILED DESCRIPTION

As it is well known, a revolving element consists of an external ring (10), an internal ring (11), balls (12) and screens (14) made of a composition of elastomer or of plastic materials (15) and plate (16). The screens (14) are forced into grooves (13) of the external ring (10) and create a labyrinth seal with internal ring (11), while the lip (17) of the elastomer or plastic portion (15) creates a seal by pressing directly on the ring (11).

A plate (18) is assembled on the internal ring (11); this plate operates as a rotating centrifuge with the internal ring. The plate (18) is also supplied with a plastic or elastomer materials lining (19) from which a slipping lip extends on the bent length (21) of the plate (16).

The upper portion of the lining (19) creates a labyrinth seal (23) having a reduced port with the external ring (10) which is appointed for avoiding coarse particles (stones, sand, mud, vegetable fibers from entering) in contact with the seal lips (17 and 20).

The chamber (22) located between the lips (17 and 20) and the plate screens (16 and 18) may be advantageously filled with grease in order to keep out eventual impurities and maintain the lubrication of the main lip (17).

However, the main element of this bearing is lip (20) which slips on the conical surface (21) of the screen (16). This is an axial type of seal; for this reason the lip (20) will always find its own setting on the surface (21) either in case of faulty assembly or in case of crashes or blows on the bearing, so as to ensure the sealing without increasing the friction among the parts in contact.

Furthermore, the rubber portion (19) of the external plate (18) will avoid the contact between metal and metal of the plates (16 and 18) still allowing a good operation of the bearing in case of crashes and damages to it.

It is possible to provide a second lip (24, FIG. 2) if a further increase of the safety of the seal is wanted. This lip extends from the rubber portion (19) and slips on the plate (16) thus forming a further barrier against impurities towards the lip (17) in case a part of them should come over the labyrinth (23) and the seal (20-21).

We claim:

1. Tight bearing suitable for exceptionally heavy duty conditions which comprises: a side screen of plate composition having an external face; external and internal bearing rings wherein said external ring restrains said side screen and said internal ring forms a labyrinth seal against said side screen; a material selected from the group consisting of plastic and elastomer materials including a lip portion which creates friction on the internal ring; and external plate having an internal face, said external plate integral with the internal ring and forming a labyrinth seal with the external ring; a layer selected from the group consisting of plastic and elastomer materials lining the internal face of the external plate; and at least one lip formed by said layer forming an essentially axial seal against the external face of the side screen plate.

2. Bearing according to claim 1 wherein the external face of the side screen plate has a bent conical portion converging towards the internal ring, wherein the lip formed by said layer which lines the internal face of the external plate slips and seals along said bent conical portion.

3. Bearing according to claim 2 including a second lip formed by said layer extending from said layer, said second lip slipping along the external face of the side screen plate.

4. Bearing according to claim 1 wherein the external plate has an upper part and wherein the layer lining the internal face of the external plate lines also the upper part of the external plate and forms a labyrinth seal with the external ring of the bearing.

5. Bearing according to claim 1 including a chamber located between the lips and the plates which is filled with grease.

* * * * *